Patented Aug. 20, 1940

2,212,175

UNITED STATES PATENT OFFICE 2,212,175

PROCESS FOR THE PRODUCTION OF ORGANIC COMPOUNDS

James Holden Clayton, Whisterfield, Siddington, and Bernard Bann, Stockport, England, assignors to The Manchester Oxide Company Limited, Manchester, England, a British company No Drawing. Application March 28, 1939, Serial No. 264,634. In Great Britain March 29, 1938

20 Claims. (Cl. 260—454)

This invention relates to the introduction of the thiocyano group into organic compounds and more particularly to improvements in the manufacture of thiocyano derivatives of organic compounds, especially amines and phenols.

In German Patent No. 579,818, there is described a method of thiocyanogenating organic compounds by taking advantage of the readiness with which cupric thiocyanate breaks down with the production of cuprous thiocyanate and thiocyanogen. According to this patent, the substance to be thiocyanogenated is treated with cupric thiocyanate, or with an intimate mixture of a cupric salt with a salt of thiocyanic acid. It is stated that a cupric salt may be added to a mixture of the compound to be thiocyanogenated and a salt of thiocyanic acid or the latter may be added to a mixture of a cupric salt and the substance to be treated. In the examples, alcohol or other organic solvent is used as a solvent for the organic compound or in some cases where an amine is treated, this is dissolved in an excess of acid. In this latter case, the whole of the acid used must subsequently be neutralized, in order to enable the product to be recovered in a convenient manner. A method has now been discovered by which thiocyano derivatives of organic compounds may be obtained in a more convenient and/or more economical manner, without the necessity of separately preparing cupric thiocyanate (which must be substantially anhydrous for good results) and without the necessity of employing an organic solvent.

According to the present invention, it has been found that the reaction can be performed in a medium which is mainly aqueous since we discovered that the cupric thiocyanate will react preferentially with the organic compound before reacting with water. Thus thiocyano derivatives of organic compounds may be obtained by dissolving or dispersing an organic compound capable of reacting with thiocyanogen, especially aniline o-toluidine or other aromatic compound, in an aqueous solution of a soluble thiocyanate, particularly an alkali metal thiocyanate, and then treating the solution or dispersion with a cupric salt. In this way, the cupric thiocyanate which is produced in situ by double decomposition gives rise, in situ, to thiocyanogen, which can react immediately with the organic compound. The cupric salt, can, moreover, be added gradually to the mixture, so that the thiocyanogen is consumed substantially as rapidly as it is formed, and no large quantity of cupric thiocyanate need be present at any time. It will be seen, moreover, that the soluble thiocyanate is always present in excess at the commencement of the reaction, and this is advantageous, since it has been found that thiocyanogen is more stable in the presence of a soluble thiocyanate. If desired, the soluble thiocyanate may be employed in excess of the amount required for reaction.

Soluble thiocyanates, for example sodium or ammonium thiocyanate, are, when in fairly concentrated aqueous solution, solvents for many organic compounds which are insoluble in water, especially aromatic amino compounds, and this greatly facilitates the reaction and renders it unnecessary in some cases, to use acid or an organic solvent to dissolve the organic compound.

A convenient way of proceeding is to add the organic compound and cupric salt successively in small quantities to a body of alkali thiocyanate solution. We may also add the cupric salt and sodium thiocyanate successively to a solution of the amine in the manner hereafter described.

We have further found, that this forms one feature of the present invention, that although an excess of acid is undesirable, since it retards the reaction, nevertheless a useful result can be obtained if there is present in the aqueous solution of soluble thiocyanate at the commencement of the reaction, or if there is added to it during the reaction, a relatively small proportion of acid for example up to approximately the molecular equivalent of the amine, though in exceptional cases up to five molecular equivalents may be added, e. g. when treating compounds containing an alkoxyl group. Oxalic acid is particularly suitable, since it tends to prevent the formation of colour (possibly due to its reducing action). The acid may be present in the thiocyanate solution or in the mixture of thiocyanate and organic compound, or may be added to the organic compound in the case where this is added in successive small quantities to the body of alkali thiocyanate solution. The presence of acid in the alkali thiocyanate solution from the start is particularly advantageous since the resulting free hydrothiocyanic acid seems to be beneficial to the reaction. Another way of adding the acid, however, is to add it to the cupric salt, which is introduced into the thiocyanate in successive small quantities. Any convenient acid may be used, such as hydrochloric acid or sulphuric acid. It is possible, especially in treating o-toluidine, to use acid and then add the cupric salt and sodium thiocyanate successively in small quantities to an excess of the amine.

When the solution of thiocyanate or thiocyanate and organic compound or the organic compound itself contains acid, it may, in some cases, be convenient to add the cupric salt in the form of an ammoniacal solution.

When the invention is applied to the thiocyanogenation of aromatic amino compounds, the products of thiocyanogenation are not necessarily thiocyano-substituted compounds. Where the position para to the amino group is not free, a thiocyano group may enter the benzene ring ortho to the amino group and give rise to a thiazole derivative.

We have further found that when the product obtained by thiocyanogenating an amine is treated with an acid for its extraction from the reaction mixture, i. e. from the paste of cuprous thiocyanate, it is best to bring the mixture to the boil, e. g. by passing steam through it, as this has been found to improve the extraction and to destroy any colour which may be present. Oxalic acid is a particularly suitable acid to employ because of the good solubility of the oxalates. The free base can then be liberated from the salt by adding an alkali such as sodium carbonate.

An alternative way of isolating the product is to treat the reaction mixture with alkali so that the base is liberated in admixture with cuprous thiocyanate.

It has also been found possible to add the cupric salt, such as cupric sulphate, in the form of a finely ground powder, instead of as a solution.

It has also been found that, to facilitate the dispersion of the organic compound in the alkali thiocyanate, any of the known dispersing agents which are inert to the reagents may be employed, (e. g. Igepon).

We have further found that it is often desirable to add to the reaction medium a water-miscible organic solvent which is inert in the reaction, such as an alcohol, e. g. methyl alcohol or ethyl alcohol improves the reaction. The process is not carried out in a solution composed mainly of the organic solvent, since, in any event, the water is present in large excess. Indeed we have found that even only 30% by volume of alcohol is sufficient to make the reaction proceed smoothly.

When water alone is used, a temperature of about 60° C. is generally required for sufficiently rapid reaction. The addition of dispersing agents reduces the temperature which may be employed. The addition of an organic solvent also reduces the temperature which can be employed, and reduces it even further than is possible by the use of a dispersing agent alone.

In the thiocyanogenation of ortho toluidine, there is a tendency for a by-product to be formed, which is of a purple colour and appears to be an oxidation product.

There is also formed a more highly thiocyanogenated product.

The presence of alcohol retards or tends to inhibit the formation of these by-products and this facilitates the production of pure thiocyano toluidine. For example, in an experiment using 30% alcohol the amount of the first mentioned impurity was cut down to a negligible amount, while the amount of the second was cut down by approximately 75%.

In the thiocyanogenation of aromatic amino compounds such as aniline and ortho-toluidine it is not necessary for the purpose of extracting the thiocyano product from the cuprous thiocyanate, even when alcohol is present, to treat the reaction product with an acid such as hydrochloric acid in order to decompose the thiocyanic salt of of the product or to bring it into aqueous solution. It has been found that the hydrothiocyanic acid salt of thiocyano ortho toluidine is sufficiently soluble in aqueous alcohol to enable it to be separated quite conveniently from the cuprous thiocyanate. The aqueous alcohol may be recovered from the resulting solution and it is not necessary to recover it in a very high concentration, since it may be used again in the process (in the form, for example, of 60% solution) for example for dissolving up the alkali thiocyanate. Since the alcohol does not need to be recovered in an anhydrous form, and since the thiocyano ortho toluidine can be recovered from the alcoholic solution, it is possible economically to wash the residual cuprous thiocyanate with 60% or even stronger alcohol for the removal of adherent product.

In addition to aniline and o-toluidine, the following are examples of compounds which may be thiocyanogenated by the process of the present invention namely, m-toluidine, p-toluidine, anthranilic acid, o-, m- and p-chloraniline α or β napthylamine o-, m- and p-phenetidine, o-, m- and p-anisidine, diphenylamine, phenol, α or β naphthol, phenyl peri acid, and phenyl glycine.

It is known that when a thiocyano group is introduced into an aromatic compound containing an amino group and another group in the para position thereto, there is a tendency for ring formation to take place with the production of 2-aminobenzthiazole. The present invention includes the process of introducing a thiocyano group whether such ring formation takes place or not. Ring formation can be prevented in such a case, however, by control of the reaction conditions (avoidance of undue acidity and heat) or by blocking the amino group with a substituent, preferably one which can afterwards readily be removed.

In general, the invention is particularly applicable to the introduction of a thiocyano group or groups into derivatives of aniline or its ring homologues having ring substituents other than nitro, e. g. halogen, carboxyl, sulphonic acid, alkyl, aryl, aralkyl, alkoxyl, aryloxyl, aralkoxyl or amino or N-substituted derivatives of aniline (other than acyl) e. g. phenyl, diphenyl, methyl, dimethyl or —CH$_2$COOH.

It is also applicable to similar derivatives of phenol or of α- or β-naphthylamine or of α- or β-naphthol in the latter two cases excluding a nitro group in the same ring as the amine or hydroxyl group as the case may be.

Thiocyano compounds obtained by the present invention are suitable for use as intermediates, e. g. in manufacture of dyes and pigments or rubber accelerators or insecticides.

The following examples, in which all parts are given by weight, illustrate how the invention may be put into practice.

EXAMPLE 1

10 parts of aniline are dissolved in 100 parts of sodium thiocyanate and 100 parts of water at 60° C.

A solution obtained by dissolving 56 parts of copper sulphate crystals in 175 parts of water is added slowly to the well-stirred solution. As the solution is added, cupric thiocyanate is formed and this is at once converted into the cuprous salt. The addition occupies half an hour and the reaction is completed by maintaining the mixture at 60° C. say for a further half hour. The mixture is then poured into 1,000 parts of hot water, filtered, the solid washed and the filtrate cooled and neutralised with sodium carbonate. The para-thiocyanoaniline produced on neutralisation is filtered off and may be further purified.

EXAMPLE 2

275 parts of sodium thiocyanate are dissolved in 275 parts of water, stirred, and heated to 40°–60° C. A solution of crystalline copper sulphate (280 parts) in water (960 parts), and aniline (50 parts) are placed in separate vessels and run in gradually to the sodium thiocyanate solution as follows:

2 parts of aniline are first added and a clear solution is obtained. 38 parts of copper sulphate solution are then run in. The dark brownish colour of the cupric salt, which is completely soluble in the excess sodium thiocyanate solution at this stage, is rapidly discharged. The addition is continued in this way, the temperature being maintained at 60°. After a time white cuprous thiocyanate separates. When the addition is complete 75 parts of concentrated hydrochloric acid are added and the temperature raised to 90°. The mixture is then filtered and the residue washed with hot water. The filtrate and washings are neutralised with sodium carbonate solution. The precipitated p-thiocyanoaniline is filtered off, washed with a little water, and recrystallised from aqueous alcohol.

The cuprous thiocyanate filtered from the reaction mixture can be treated for recovery of its copper and thiocyanogen content, if desired.

EXAMPLE 3

Aniline (93 parts by weight) is dissolved in alcohol (100 parts) and warmed to 35° C. Copper sulphate (500 parts) is dissolved in 1,500 parts water. Sodium thiocyanate (500 parts) is dissolved in alcohol (500 parts).

To the solution of aniline at 35° C. the solution of coppper sulphate and sodium thiocyanate are slowly added with stirring. After two hours the liquor is cooled and neutralized with sodium carbonate. The liquor is now filtered and the mixed cake extracted with alcohol. After reducing the bulk of the alcohol and cooling the product separates in needles.

EXAMPLE 4

275 parts of sodium thiocyanate are dissolved in 275 parts of water, stirred, and heated to 60° C. A solution of crystalline copper sulphate (280 parts) in water (960 parts), and o-toluidine (57.5 parts) are placed in separate vessels, and run in gradually to the sodium thiocyanate solution as follows:

2 parts of o-toluidine are first added and a clear solution is obtained. 38 parts of copper sulphate solution are then run in. The dark brownish colour of the cupric salt, which is completely soluble in the excess sodium thiocyanate solution at this stage, is rapidly discharged. The addition is continued in this way, the temperature being maintained at 60° C. or at a lower temperature if a suitable dispersing agent is added. After a time white cuprous thiocyanate separates. When the addition is complete, 75 parts of concentrated hydrochloric acid are added and the temperature raised to 90°. The mixture is then filtered and the residue washed with hot water. The filtrate and washings are neutralised with sodium carbonate solution. The precipitated p-thiocyano-o-toluidine is filtered off, washed with a little water, and recrystallised from aqueous alcohol.

EXAMPLE 5

Ortho toluidine (100 parts by weight) is dissolved in alcohol (100 parts) and warmed to 35° C. Copper sulphate (500 parts) is dissolved in 1,500 parts water. Sodium thiocyanate (500 parts) is dissolved in alcohol 500 parts.

To the solution of ortho toluidine at 35° C. the solution of copper sulphate and sodium thiocyanate are slowly added with stirring. After two hours the liquor is cooled and neutralised with sodium carbonate. The liquor is now filtered and the mixed cake extracted with alcohol. After reducing the bulk of the alcohol and cooling the product separates in needles.

EXAMPLE 6

*2-amino-6-methyl benzthiazole*

21.4 parts para-toluidine are dissolved in 20 parts hydrochloric acid and 120 parts water, and the solution added to 100 parts sodium thiocyanate in 100 parts water. With the temperature at 35° C. 100 parts copper sulphate in 300 parts water is added over a period of 1 hour. An equal volume of water is added to the thick product of reaction which is then heated to 80° C. and filtered. The cake is washed with hot water, and the combined filtrates cooled and neutralized with sodium carbonate when the thiazole is precipitated as a white solid. M. P. 134°.

EXAMPLE 7

*4-4' dithiocyanodiphenylamine*

42 parts of diphenylamine are dissolved in 400 parts of alcohol and heated to 40° C. The following two solutions are then run in simultaneously over a period of 1½–2 hours.

A. 250 parts of sodium thiocyanate (NaCNS2H₂O) in
   250 parts of water.
B. 250 parts of crystalline copper sulphate in
   750 parts of water.

When the addition is complete the mixture is heated to 60° for ½ hour. It is then cooled and neutralised with 100 parts of soda ash in 1000 parts of water.

The mixture is filtered and the cake extracted with alcohol. The alcoholic solution on concentration yields the dithiocyano derivative as pale yellow crystals M. P. 120°.

EXAMPLE 8

*4-thiocyano-1-amino-2-5-dimethyl benzene*

250 parts of sodium thiocyanate (NaCNS2H₂O) are dissolved in 250 parts of water and acidified with 13 parts of sulphuric acid. 55 parts of paraxylidine (1 amino 2-5 dimethyl-benzene) are added and the mixture warmed to 60°. 250 parts of crystalline copper sulphate in 750 parts of water are added over a period of one hour. The mixture is left to stand overnight and then poured into 100 parts of soda ash in 2000 parts of water.

The mixture is filtered and the cake extracted with boiling alcohol. On distillation of the alcohol the thiocyano-p-xylidine is left as an oil which readily solidified on cooling. M. P. 57°.

Example 9

4-thiocyanophenol

A solution of crystalline sodium thiocyanate (475 parts by weight in 500 parts water) is warmed to 40° C. Sulphuric acid (26 parts in 200 water) is added, and then a solution of phenol (93 parts by weight in 100 parts water) is immediately poured in, giving a light red solution. Copper sulphate solution (465 parts in 1500 parts water) is slowly added with stirring.

When the copper sulphate solution has been added and the precipitated CuCNS has assumed a light colour (1½ to 2 hours) the reaction mixture is cooled and the whole extracted with benzene. On removal of the benzene an oil separates, which solidifies on trituration with a small amount of methyl alcohol. The solid crystallises from petroleum ether to give colourless needles. M. P. 58° C.

Example 10

4-thiocyano dimethylaniline

Dimethyl aniline (24.2 parts by weight) is dissolved in a solution of oxalic acid (62 parts in 100 cc. water) at 40° C., and a solution of sodium thiocyanate (95 parts in 100 cc. water) is then added.

To this solution at 40° C. a solution of copper sulphate (93 parts in 300 cc. water) is slowly added with stirring. After the addition of the copper sulphate and further standing for 1–2 hours, the reaction mixture is cooled and poured into sodium carbonate solution. After filtration the mixed cake is dried and extracted with boiling alcohol. On reducing the volume of alcohol, the product separates in plates. M. P. 67°.

Example 11

2 amino-5 thiocyanobenzoic acid 250 parts of sodium thiocyanate (NaCNS 2H₂O) are dissolved in 250 parts of water and 13.5 parts of sulphuric acid are added. 65.5 parts of anthranilic acid are added and the mixture heated to 60° C. when a clear solution is obtained. This is then cooled to 40° C. stirred, and a solution of 250 parts of crystalline copper sulphate in 750 parts of water, is run in over a period of 1½ to 2 hours. The mixture is then heated to 60° cooled, and poured into water. The filtered cake is extracted with alcohol and the alcoholic solution diluted with water. The thiocyano compound can be filtered off and dried. M. P. 178°.

Example 12

2:chloro:5:thiocyanoaniline 64 parts orthochloraniline are dissolved in 25 parts sulphuric acid and 100 parts water at 60° C. The solution is poured into a stirred solution of 250 parts sodium thiocyanate (NaCNS 2H₂O) in 250 parts water at 30° C. The liquid remains clear at 40° C., and 250 parts copper sulphate in 750 parts water is added over ¾ hour with stirring. The temperature is taken up to 50° C. towards the end. The thick paste is then cooled, and neutralised with sodium carbonate solution. The mixed cake is filtered, and washed, then extracted with alcohol. The product crystallises in pale yellow needles. M. P. 67° C.

Example 13

2:amino:6:chlorobenzthiazole 64 parts p-chloraniline are dissolved in 50 parts of hydrochloric acid and 50 parts water at 60° C. and poured into solution of 250 parts sodium thiocyanate in 800 parts water. With the temperature at 40° C. 250 parts copper sulphate in 750 parts water is added slowly with stirring over 2 hours. The product is then warmed to 80° C., and filtered and the cake extracted again at 90° with very weak hydrochloric acid (50 parts in 100 parts water). The mixed filtrates are cooled and neutralized with sodium carbonate, when the thiazole is filtered and washed. The product crystallises from alcohol. M. P. 202°.

Example 14

4-thiocyano-1-amino-2:5-dimethyl benzene 61 parts p-xylidine is dissolved in 50 parts hydrochloric acid and 100 parts water, the solution poured into 250 parts sodium thiocyanate in 250 parts water at 40° C. 250 parts copper sulphate in 750 parts water is added slowly over 2 hours, the temperature taken up to 50° C. towards the end. The product is heated to 90° C., filtered, and the remaining cake extracted with a further 50 parts hydrochloric acid in 500 parts water.

The combined filtrates are cooled, neutralized, and the product filtered off and washed with water. It crystallises from alcohol/water in white needles. M. P. 57° C.

Example 15

4-thiocyano-2-methoxyaniline 24.6 parts o-anisidine are added to a solution of 100 parts sodium thiocyanate in 100 parts water and 100 parts hydrochloric acid. The mixture is warmed to 50° C., and 100 parts copper sulphate in 300 parts water added over 1 hour. The mixture is then warmed to 60° C. and filtered; the cake washed with hot water. The filtrate is neutralised with sodium carbonate, the product filtered and washed, and recrystallised from alcohol/water in white needles. M. P. 55°.

We declare that what we claim is:

1. The process of producing a sulphur derivative of an aromatic compound which comprises treating said compound in solution with a solution of an inorganic thiocyanate and with a cupric salt, the reaction medium from which the product has to be recovered being mainly water.

2. The process of producing a sulphur derivative of an aromatic compound containing a nuclear substituent selected from the group which consists of amino and hydroxyl radicals which comprises treating said compound in solution with a solution of an inorganic thiocyanate and with a cupric salt, the reaction medium from which the product has to be recovered being mainly water.

3. The process of producing a sulphur derivative of an aromatic amine which comprises treating said aromatic amine in solution and in the presence of a limited amount of acid amounting to less than five times the equivalent of amine with a solution of an inorganic thiocyanate and with a cupric salt, the reaction medium from which the product has to be recovered being mainly water.

4. The process as claimed in claim 3 in which the acid is oxalic acid.

5. The process as claimed in claim 3 in which the quantity of acid is less than twice the equivalent of the amine.

6. The process as claimed in claim 3 in which the quantity of acid is about the equivalent of the amine.

7. The process as claimed in claim 1 in which the cupric salt is added successively in small quantities to a solution containing the aromatic compound and the inorganic thiocyanate.

8. The process as claimed in claim 3 in which the cupric salt is added successively in small quantities to a solution containing the aromatic amine and the inorganic thiocyanate.

9. The process as claimed in claim 3 in which the acid is mineral acid added in part at least to the reaction medium during the reaction.

10. The process of producing a thiocyano derivative of an aromatic amine which consists in producing cupric thiocyanate by double decompostion in presence of said aromatic amine and a substantial quantity of water and a limited quantity of an acid.

11. The process as claimed in claim 1 in which alcohol is present in the reaction medium.

12. The process as claimed in claim 3 in which alcohol is present in the reaction medium.

13. Process of producing a sulphur derivative of an aromatic compound which comprises treating said aromatic compound with an aqueous solution of a thiocyanate and with a cupric salt in presence of a dispersing agent.

14. The process as claimed in claim 3 in which the reaction is performed in presence of a dispersing agent.

15. The process as claimed in claim 3 in which the reaction is performed at a temperature of not more than about 60° C.

16. The process as claimed in claim 3 in which the aromatic amine is a monoamine of the benzene series.

17. The process of producing thiocyanoaniline which consists in treating a solution of aniline in an aqueous thiocyanate solution with a cupric salt and not more than two molecular equivalents of acid.

18. The process of producing 5-thiocyano-2-aminotoluene which comprises treating o-toluidine with an aqueous thiocyanate solution and with a cupric salt.

19. The process of producing thiocyanoaniline which consists in treating aniline in presence of a substantial quantity of water with cupric thiocyanate generated in situ.

20. The process of producing 5-thiocyano-2-aminotoluene which consists in treating o-toluidine in presence of a substantial quantity of water with cupric thiocyanate generated in situ.

JAMES H. CLAYTON.
BERNARD BANN.